United States Patent [19]

Jones

[11] Patent Number: 4,802,709
[45] Date of Patent: Feb. 7, 1989

[54] DUMPING UTILITY TRAILER
[75] Inventor: Mark G. Jones, Paris, Tex.
[73] Assignee: J-10, Inc., Paris, Tex.
[21] Appl. No.: 801,508
[22] Filed: Nov. 25, 1985

Related U.S. Application Data
[63] Continuation of Ser. No. 524,651, Aug. 19, 1983, abandoned.
[51] Int. Cl.4 .............................................. B60P 1/24
[52] U.S. Cl. ......................................... 298/10; 298/5; 298/6; 414/421
[58] Field of Search ...................... 298/5, 6, 2, 10, 38; 414/490, 419, 421

[56] References Cited
U.S. PATENT DOCUMENTS

| | | | |
|---|---|---|---|
| 859,928 | 7/1907 | Donnelly | 298/10 |
| 898,204 | 9/1908 | Feller | 298/2 |
| 1,071,056 | 8/1913 | Jones et al. | 298/5 |
| 2,755,001 | 7/1956 | Doepke et al. | 414/421 X |
| 2,952,434 | 9/1960 | Blanchard | 298/10 |
| 3,000,671 | 9/1961 | Monegato | 298/10 |
| 3,160,439 | 12/1964 | Kazakowitz | 298/2 |
| 3,294,266 | 12/1966 | Snow | 414/421 |
| 3,659,731 | 5/1972 | Carson | 414/421 |
| 4,187,950 | 2/1980 | Peet | 414/421 |
| 4,417,765 | 11/1983 | Wirsbinski | 298/5 |

FOREIGN PATENT DOCUMENTS
748279 4/1956 United Kingdom .

Primary Examiner—Frank E. Werner
Assistant Examiner—Janice Krizek
Attorney, Agent, or Firm—Ross, Howison, Clapp & Korn

[57] ABSTRACT

A dumpable utility trailer comprising a frame assembly, a container assembly rotatably connected to the frame assembly so as to permit rotation of the container from an upright position to an inverted position, and a latch assembly adapted to limit the rotation of the container assembly relative to the frame assembly.

1 Claim, 3 Drawing Sheets

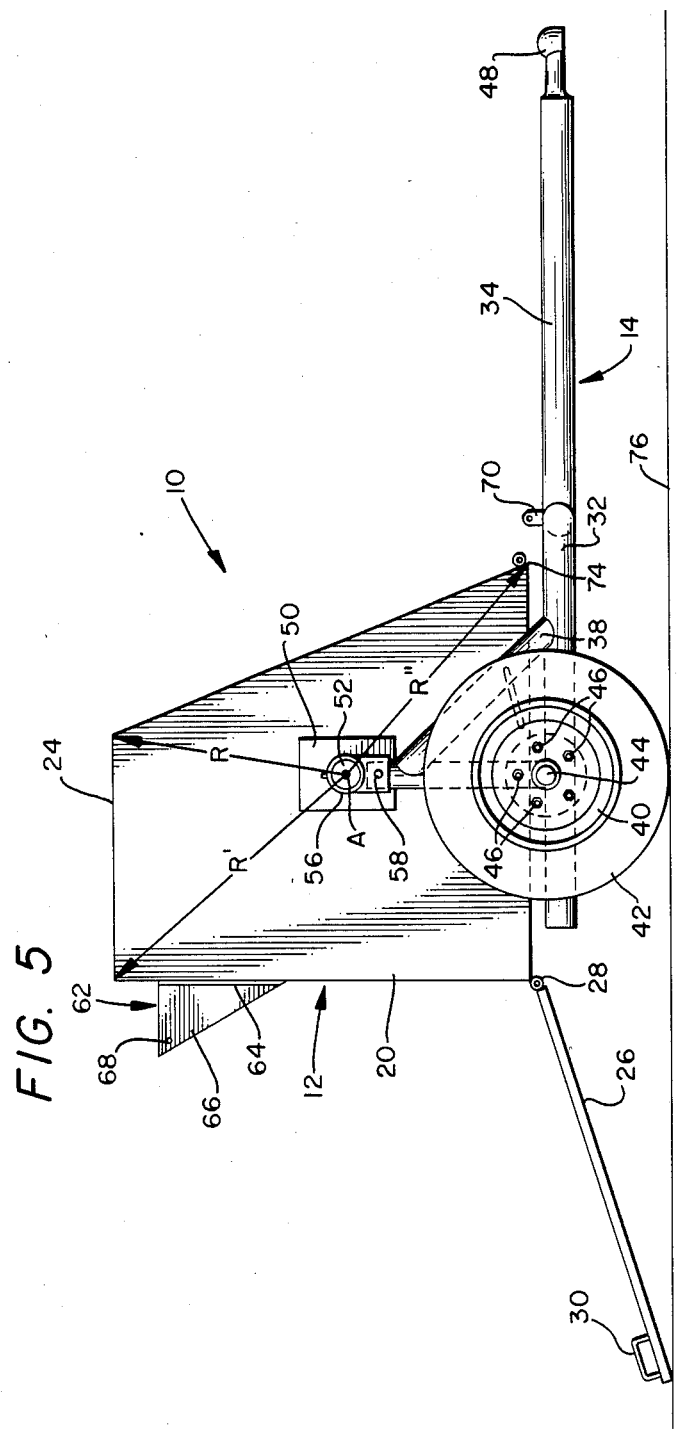

4,802,709

DUMPING UTILITY TRAILER

This is a continuation of application Ser. No. 06/524,651 filed Aug. 19, 1983, now abandoned.

TECHNICAL FIELD

This invention relates to utility trailers, and more particularly, to a utility trailer that is adapted for dumping. One aspect of the invention relates to a utility trailer that can be dumped with minimal effort by the user. Another aspect of the invention relates to self-dumping utility trailers. Still another aspect of the invention relates to dumping utility trailers wherein the dumping container can be rotated to a fully inverted position to facilitate dumping.

BACKGROUND OF THE INVENTION

Wheelbarrows, pushcarts, wagons, trailers and the like have long been used for transporting loads that are heavier and/or bulkier than can be handled manually, or that are to be moved over considerable distances. Of particular interest for purposes of the present invention are vehicles comprising a receptacle or container that is adapted to be dumped once the material or cargo being transported in the vehicle is delivered to the intended destination. Such vehicles can be manually propelled, or can be adapted to be drawn by livestock, motorized vehicles, or the like. Prior art dump vehicles are disclosed, for example, in the following U.S. patents: U.S. Pat. Nos. 492,562; 771,134; 898,204; 2,464,709; 2,770,491; 2,973,224; 3,000,671; 3,479,048; and 3,604,753.

Notwithstanding the devices that have previously been disclosed, however, there remains a need for a utility trailer that is adapted to carry large or heavy loads, and which can be manually dumped by a single individual if desired.

SUMMARY OF THE INVENTION

According to the present invention, a utility trailer is provided that is adapted to be dumped and then returned to its upright position with minimal effort. The subject trailer preferably comprises a wheeled frame assembly and a rotatably mounted container assembly. The frame assembly is preferably adapted to be connected to a towing means. The container assembly is preferably mounted so that it can be rotatably inverted and its contents discharged without disconnecting the frame assembly from the towing means.

According to one preferred embodiment of the invention, the container assembly is rotatably connected to the frame assembly along a rotational axis that extends transversely through the container or receptacle in close proximity to its center of gravity. When constructed in this manner, the container assembly can be rotated to either the upright or dumping position with minimal effort by the user.

According to another preferred embodiment of the invention, the container assembly is constructed so that its rotational axis lies sufficiently forward of its center of gravity that the container will automatically rotate to the dumping position unless restrained in its upright position. According to this embodiment, the container is preferably restrained in its upright position and during loading and transport by a releasable locking assembly that is operated by the user.

According to another embodiment of the invention, the container assembly is rotatably connected to support sleeves that are in turn releasably connected to vertical support arms of the frame assembly.

According to another embodiment of the invention, a manually dumpable utility trailer is provided that comprises a frame assembly further comprising a transverse member having spaced apart longitudinal members extending rearwardly therefrom, a forwardly extending towing member connected to the transverse member, and at least one rotatably mounted wheel connected to each longitudinal member. These wheels cooperate with the forwardly extending towing members to maintain the transverse and longitudinal members and the container assembly connected thereto above an underlying support surface and to facilitate movement from one point to another.

By way of example, but without limitation, the apparatus of the invention can be used for transporting trash, garbage or other refuse, building materials, soil, aggregate, livestock feed, farm produce, or the like. If tightly constructed, the subject apparatus can also be used for transporting liquids such as water. According to a preferred embodiment of the invention, the container assembly is also provided with a hinged cover.

With the invention disclosed herein, an individual can quickly and conveniently handle and dump materials having much greater bulk and weight than would otherwise be possible. Furthermore, the design of the frame assembly permits the open portion of the container or receptacle of the container assembly to be rotated in a rearward direction to a point where the open portion is downwardly directed, facilitating dumping and, in some cases, the loading of comminuted bulk materials or heavy articles, as well as dumping. Other advantages of the invention will become apparent upon reading the detailed description below.

BRIEF DESCRIPTION OF THE DRAWINGS

The apparatus of the invention is further described and explained in relation to the following drawings wherein:

FIG. 5 depicts a side elevation view of the apparatus of FIG. 1 wherein the container assembly is rotated to a fully inverted dumping position.

Like numerals are used to designate like parts in all figures of the drawings.

DETAILED DESCRIPTION OF A PREFERRED EMBODIMENT

Figure 1:
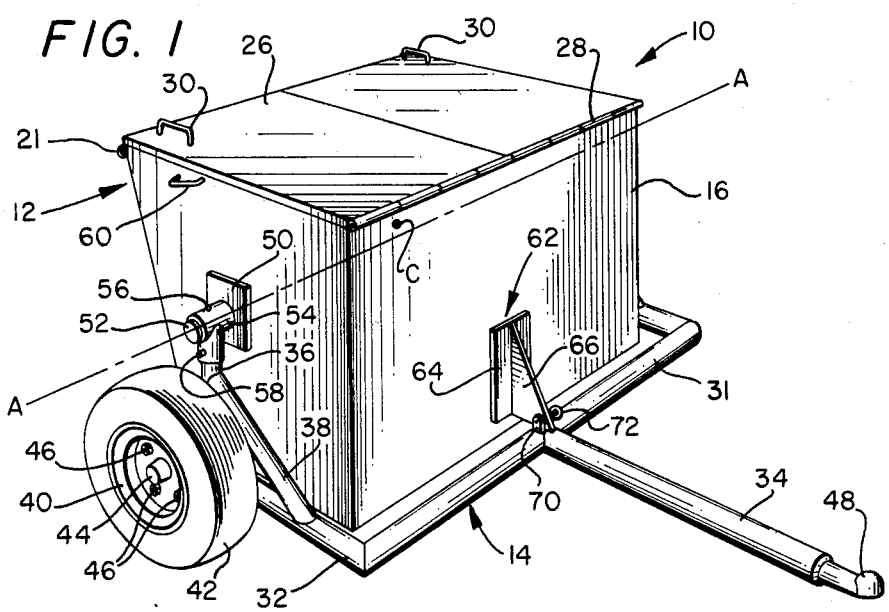
FIG. 1 depicts a perspective view of one preferred embodiment of the utility trailer of the invention.
Figure 2:
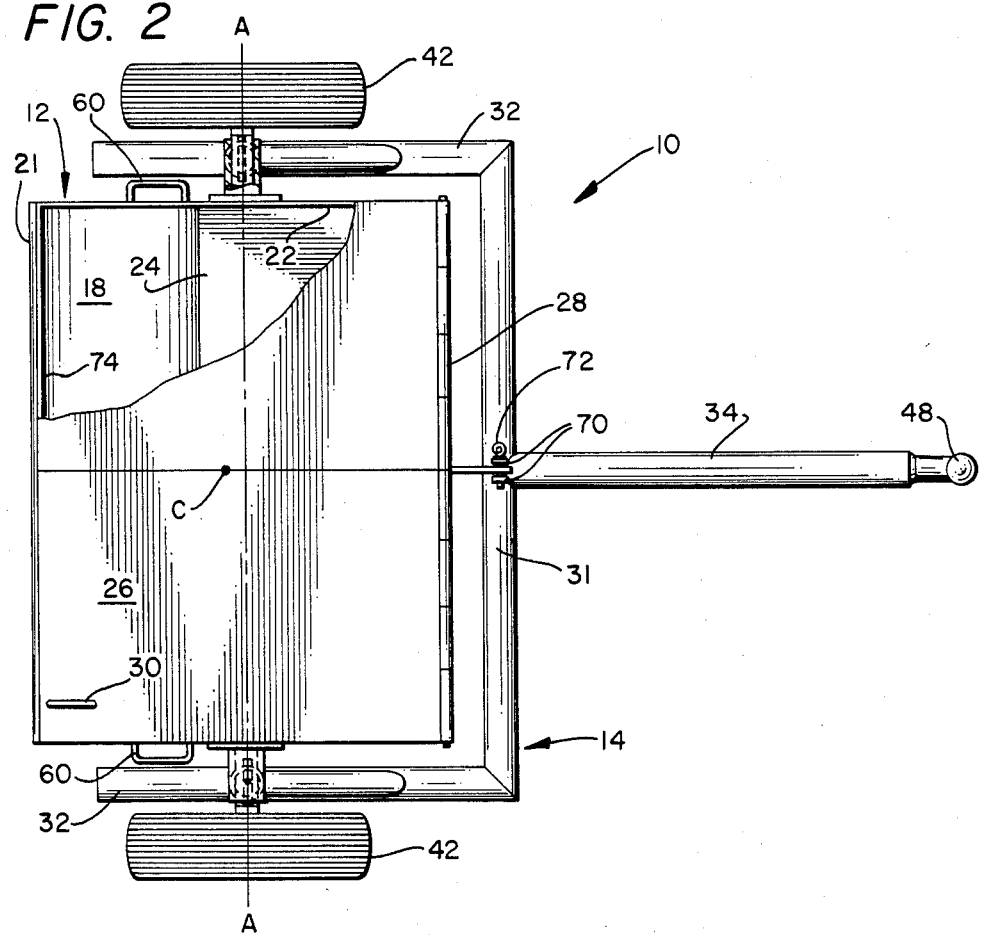
FIG. 2 depicts a plan view of the apparatus shown in FIG. 1, wherein a portion of the cover on the container assembly is broken away to reveal its interior space.
Figure 3:
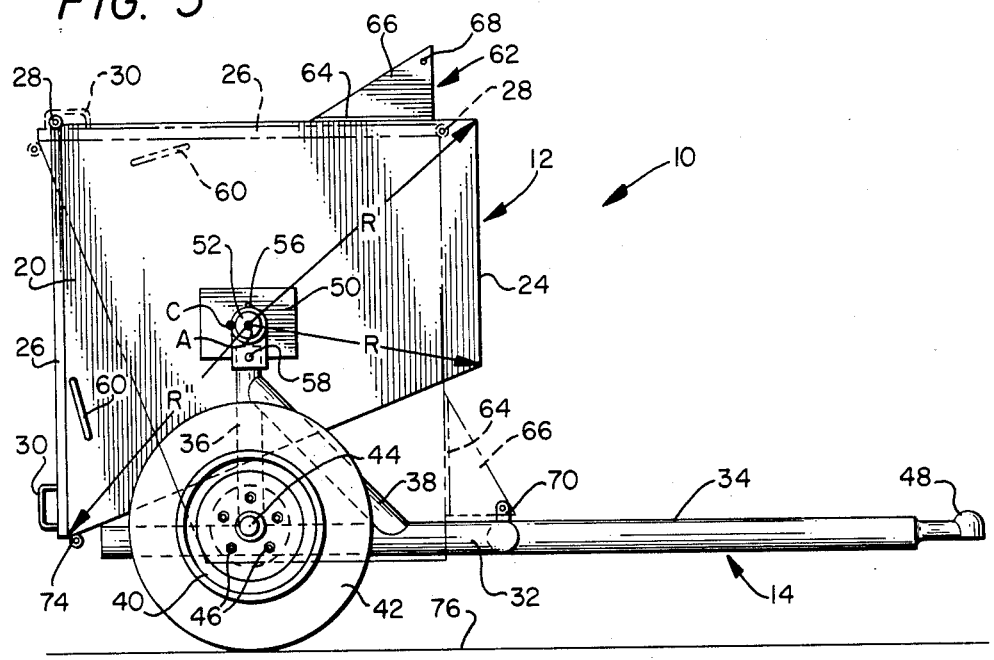
FIG. 3 depicts a side elevation view of the apparatus of FIG. 1 wherein the container assembly is rotated to a dumping position, with the upright or transport position of the container assembly as seen in FIG. 1 being shown in phantom.

Referring to FIGS. 1-3, utility trailer 10 preferably comprises container assembly 12 and frame assembly 14. Container assembly 12 further comprises front wall 16, back wall 18, side walls 20, 22 and bottom 24. The walls and bottom of container assembly 12 define a receptacle having an interior space disposed therebetween, and are preferably constructed from panels of metallic sheet material that are cut to suitable size and then connected by conventional methods such as by welding, bolting, riveting, or the like. Metallic bracing members can also be employed for further strengthening container assembly 12 and for facilitating its construction. Although metallic sheet material is preferred for use in making container assembly 12, it will be understood and appreciated that various other materials can be similarly utilized, depending upon the intended use of the apparatus. Thus, for example, wood, plastic, or fiberglass might be a preferred material for use in some applications. Where container assembly 12 is constructed from plastic or fiberglass, the wall and bottom portions can be unitarily molded if desired.

As shown in FIGS. 1-3, container assembly 12 is provided with cover 26 that is pivotally connected by hinge 28 to front wall 16. Handles 30 are provided for the user's convenience in raising and lowering cover 26. Although cover 26 is shown in FIGS. 1-3 as comprising a single sheet of material, it will be understood and appreciated that a foldable cover or split or multiple-part cover can also be utilized within the scope of the invention. Cover 26 can be, but need not necessarily be, constructed from the same material as the walls and bottom of container assembly 12. Thus, for example, it may be desirable to construct the walls and bottom of container assembly 12 from metallic sheet material and to construct cover 26 from a relatively lighter weight material to facilitate raising and lowering.

Although the shape of container assembly 12 as shown in FIGS. 1-3 is preferred for use in the apparatus of the invention, other shapes and configurations can also be employed within the scope of the invention subject to certain limitations as are discussed in more detail below.

Container assembly 12 is preferably supported on and rotatably connected to frame assembly 14. Frame assembly 14 preferably comprises a transverse member 31 having spaced apart longitudinal members 32 extending rearwardly therefrom and a forwardly extending towing member 34 connected to transverse member 31. Support arms 36 and braces 38 are connected to longitudinal members 32 and extend upwardly therefrom. Wheels 40 having tires 42 mounted thereon are rotatably connected to longitudinal members 32 by means of hub 44 and lugs 46.

Transverse member 31, longitudinal members 32, towing frame 34, support arms 36 and braces 38 are preferably fabricated from metallic pipe that is cut and welded into a unitary structure having the desired configuration. It will be understood and appreciated by those of ordinary skill in the art having the benefit of this disclosure, however, that metallic structural members having cross sections different than those shown in FIGS. 1-3 can also be employed within the scope of the invention.

According to a preferred embodiment of the invention, a connector assembly 48 is provided at the forward extending end of towing frame 34 for use in connecting utility trailer 10 to a suitable towing means. Connector assembly 48 can be selected from any of the numerous well-known, commercially available trailer hitches and other devices that are suitable for use in connecting trailers to tow vehicles.

Side walls 20, 22 of container assembly 12 preferably each comprise a pivot support block 50 and cylindrical pivot sleeves 52 which are connected by welding or the like in fixed relation thereto. Cylindrical pivot sleeves 52 extend through the horizontally extending upper portion of tees 54 and are rotatably mounted therein by means of bearings, bushings or the like. Grease fittings 56 can be provided for lubricating bearings disposed therein. Once tees 54 are installed on cylindrical pivot sleeves 52, the downward extending cylindrical collar portions of tees 54 are slipped over the upward extending portions of support arms 36 and connected thereto by means of set screws 58 or the like. This design also permits the removal of container assembly 12 from frame assembly 14 for shipment, storage, or where otherwise desired. Handles 60 on side walls 20, 22 are preferably provided to assist the user in rotating container assembly 12 as needed. Reinforcing bar 21 adds rigidity to lip 74 of back wall 18 and can also be grasped by the user when rotating container assembly 72.

According to a preferred embodiment of the invention, container assembly 12 is further provided with a latch assembly 62 adapted to maintain container assembly 12 in an upright position. Numerous conventional and commercially available mechanisms can be successfully employed as latch assembly 62 of the invention. As shown in FIGS. 1-3, latch assembly 62 comprises support block 64 welded to front wall 16 of container assembly 12 and a forward extending locking plate 66 welded in fixed relation thereto. Aperture 68 preferably extends transversely through locking plate 66 and is desirably positioned so as to be brought into cooperating alignment with corresponding apertures through ears 70 on transverse member 31 whenever container assembly 12 is in the upright position. Retaining pin 72 as shown in FIGS. 1 and 2 can be satisfactorily employed for interconnecting locking plate 66 to ears 70. Although the latch assembly 62 has proven to be satisfactory for use in the present invention, it is understood that other similarly effective devices can also be employed. Thus, for example, remotely actuated latching mechanisms can be provided which are controlled by an operator seated on a towing vehicle.

Although the specific configuration of container assembly 12 can vary widely within the scope of the invention, certain limitations are preferably observed in designing the apparatus in order to maximize the beneficial functions of the invention. Thus, for example, it is preferred that frame assembly 14 be designed in such manner that lip 74 of back wall 18 can be freely rotated from an upright position as shown in phantom in FIG. 3, through an intermediate position at or near ground level as shown in solid outline in FIG. 3, to a fully inverted dumping position as shown in FIG. 5 once locking assembly 62 is released. For this reason, frame assembly 14 comprises no structural members that will impede the rotation of container assembly 12 in a rearward direction as lip 74 of back wall 18 rotates to the inverted dumping position. The rearwardly extending C-shaped design of frame assembly 14 has proved to be particularly satisfactory for achieving this result since no frame members, axles, or the like are disposed beneath container assembly 12 to impede its rotation or the discharge of matter therefrom.

In order for container assembly 12 to be rotatable to the dump position shown in FIG. 5, it is desirable that the radial distance R between the rotational axis A—A of container assembly 12 and the line of intersection between back wall 18 and bottom 24, and the radial distance R" between rotational axis A—A and lip 74 each be less than the vertical distance between the rotational axis A—A of container assembly 12 and the ground 76 or other underlying support surface. Similarly, the radial distance R' between the rotational axis A—A of container assembly 12 and the line of intersection between front wall 16 and bottom 24 should be less than the radial distance between the rotational axis A—A of container assembly 12 and the most rearwardly extending portion of transverse member 31. The angle of rotation of container assembly 12 about rotational axis A—A in a rearward direction will preferably range up to about 200 degrees. For dumping, the preferred rotational angle from the upright position can range from about 90 degrees to about 200 degrees, with about 180 degrees being most preferred.

The location of rotational axis A—A of container assembly 12 relative to the center of gravity C of container assembly 12 will contribute in large part to the ease with which container assembly 12 can be rotated from the upright position depicted in FIGS. 1, 2 and in phantom in FIG. 3 to the fully inverted dumping position depicted in FIG. 5. In order for utility trailer 10 of the invention to be self-dumping, rotational axis A—A must extend transversely across container assembly 12 slightly forward of its center of gravity, shown as point C in FIGS. 1-3. Although the position of the center of gravity of container assembly 12 will remain fixed for an unloaded container having a particular configuration, the position of the center of gravity of a loaded container assembly 12 will necessarily vary according to the extent and distribution of the load. Generally speaking, for container assemblies having the configuration shown in the accompanying drawings, it is preferred that the rotational axis of container assembly 12 extend transversely across the container assembly at substantially the same level as and slightly forward of the center of gravity C of the unloaded container. When designed and constructed in this manner, container assembly 12 will rotate to the dumping position with little or no effort on the part of the operator once retaining pin 72 is removed or latch assembly 62 is otherwise disengaged.

Handles 60 on side walls 20, 22 and reinforcing bar 21 are provided for the convenience of the operator in applying additional rotational force to container assembly 12 in either an upward or downward direction, depending upon the loading and upon the positional relationship between rotational axis A—A and the center of gravity C.

According to a preferred embodiment of the invention, container assembly 12 will automatically rotate to the dumping position upon the release of latch assembly 62, and when unloaded, will return to its upright position with a minimal application of upward force for relatching of latch assembly 62. It should also be understood and appreciated that the tendency of container assembly 12 to rotate around rotational axis A—A is also affected by the friction between pivot sleeves 52 and tees 54, and by the mass of cover 26 and its position relative to the center of gravity C of the container assembly.

Moreover, although the apparatus of the invention has been described in relation to its usefulness for transporting and dumping various materials, it will be appreciated by those of skill in the art upon reading the present disclosure that the loading of container assembly 12 is also facilitated by the capability of lip 74 to be rotated to a position at or near ground level.

Figure 4:
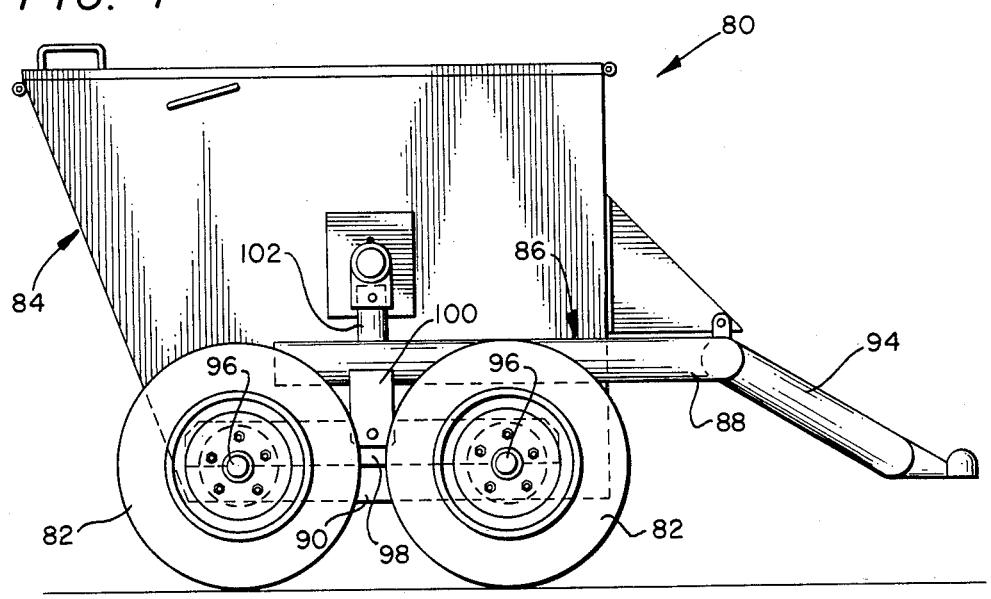
FIG. 4 depicts a side elevation view of another embodiment of the invention wherein a plurality of wheels are disposed on each side of the container assembly.

According to another embodiment of the invention, as shown in FIG. 4, a utility trailer 80 having a plurality of wheels 82 disposed on either side thereof can be constructed for use with container assemblies 84 having a greater load-carrying capability. The frame assembly 86 preferred for use with utility trailer 80 is similar to that previously described for use with utility trailer 10. In this embodiment, however, longitudinal members 88 are positioned higher with respect to bottom 90 of container assembly 84 than were longitudinal members 32 with respect to bottom 24 of container assembly 12. Because of this, towing frame 94 is downwardly inclined in the forward direction to facilitate connection to a towing means. Also, hubs 96 of wheels 82 are connected to longitudinal members 88 through pivotally mounted suspension arm 98 and bracket 100 rather than directly to support frame 32 as were hubs 44 of utility trailer 10. Although not shown in FIG. 4, it is further understood that conventional means such as springs, shock absorbers or the like can be employed to control the motion of suspension arm 98 relative to support frame 88, and that other accessories such as brakes, fenders, lights, and the like can be included if desired.

Container assembly 84 of utility trailer 80 is preferably connected to frame assembly 86 in the same manner as previously described for connecting container assembly 12 to frame assembly 14. However, the use of braces such as braces 38 of frame assembly 14 may not be required with frame assembly 86 because of the relatively shorter length of support arms 102 that are used in this embodiment in view of the reduced distance between longitudinal members 88 and the rotational axis of container assembly 84.

Although the apparatus of the invention has been described herein in relation to its preferred embodiments, other alterations and modifications of the invention will become apparent to those of ordinary skill in the art upon reading the present disclosure, and it is intended to cover all such modifications as fall within the scope of the appended claims.

What is claimed is:

1. A dumpable utility trailer comprising a frame assembly, a container assembly rotatably connected to said frame assembly, and a releasable latch assembly;

said frame assembly comprising a transverse member having spaced apart longitudinal members extending rearwardly therefrom, a singular towing member extending forwardly of said transverse member and connected thereto and having disposed at the forwardly extending end thereof a trailer hitch adapted to releasably couple said dumpable utility trailer to a tow vehicle, at least one wheel connected to each of said longitudinal members, and upwardly extending support arms adapted to connect said container assembly to said longitudinal members, said frame assembly being devoid of structure extending transversely across its width beneath or rearwardly of said container assembly;

said container assembly comprising container means, and means for rotatably connecting said container means to said upwardly extending support arms so as to permit rotational motion of said container means between the spaced apart longitudinal members of said frame assembly from an upright position to a fully inverted dumping position, and thereafter, by reversing the direction of rotation, back to an upright position;

said means for rotatably connecting said container means to said upwardly extending support arms defining a rotational axis of said container means that extends generally parallel to said transverse member at substantially the same level as and forward of the center of gravity of the container means when said container means is in an upright position relative to said frame assembly;

said transverse member of said frame assembly being disposed forward of said container means when said container means is in an upright position relative to said frame assembly; and said latch assembly being adapted to maintain said container means in an upright position relative to said frame assembly until said latch assembly is released to effect dumping.

* * * * *